US011902014B2

(12) United States Patent
Sato (10) Patent No.: US 11,902,014 B2
(45) Date of Patent: Feb. 13, 2024

(54) SIGNAL PROCESSING DEVICE AND TRANSMISSION DEVICE

(71) Applicant: FUJITSU LIMITED, Kawasaki (JP)

(72) Inventor: Hidetoshi Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 17/863,007

(22) Filed: Jul. 12, 2022

(65) Prior Publication Data

US 2023/0079464 A1 Mar. 16, 2023

(30) Foreign Application Priority Data

Sep. 13, 2021 (JP) .................................. 2021-148235

(51) Int. Cl.
*H04J 14/02* (2006.01)
*H04B 10/079* (2013.01)

(52) U.S. Cl.
CPC .... *H04J 14/0221* (2013.01); *H04B 10/07955* (2013.01)

(58) Field of Classification Search
CPC .. H04J 14/0221; H04J 14/02; H04J 14/02216; H04B 10/07955; H04B 10/564; H04B 10/572; H04B 10/60; H04B 10/40; H04B 10/50; H04B 10/58; H04B 10/07
See application file for complete search history.

(56) References Cited

U.S. PATENT DOCUMENTS

| | | | |
|---|---|---|---|
| 2012/0157857 A1* | 6/2012 | Abe | A61B 7/003 600/484 |
| 2015/0295664 A1* | 10/2015 | Kobayashi | H04B 1/0475 375/227 |
| 2017/0126315 A1 | 5/2017 | Saito et al. | |
| 2017/0134097 A1 | 5/2017 | Morie | |
| 2020/0106543 A1* | 4/2020 | Jiang | H04B 10/503 |
| 2023/0305120 A1* | 9/2023 | John | G01S 7/4802 356/5.01 |

FOREIGN PATENT DOCUMENTS

| | | |
|---|---|---|
| JP | 2015-214384 A | 12/2015 |
| JP | 2017-085475 A | 5/2017 |
| WO | WO 2015/190097 A1 | 12/2015 |

* cited by examiner

*Primary Examiner* — Hibret A Woldekidan
(74) *Attorney, Agent, or Firm* — STAAS & HALSEY LLP (57) ABSTRACT

A signal processing device includes: a first conversion circuit that, among optical signals of channels included in wavelength division multiplexed optical signal, converts electric field signals that indicate electric field components of the optical signal of a predetermined channel, from time domain signals into frequency domain signals; a filter that passes the electric field signals converted into the frequency domain signals with a passband; a second conversion circuit that converts the electric field signals, from the frequency domain signals into the time domain signals; an amplitude measurement circuit that measures first amplitudes of the electric field signals and second amplitudes of the electric field signals; and a notification circuit that notifies a power measurement device that measures power of the optical signal of the predetermined channel, of the first amplitudes and the second amplitudes used in correction of a measurement error of the power of the optical signal.

9 Claims, 10 Drawing Sheets

SIGNAL PROCESSING DEVICE AND TRANSMISSION DEVICE

CROSS-REFERENCE TO RELATED APPLICATION

This application is based upon and claims the benefit of priority of the prior Japanese Patent Application No. 2021-148235, filed on Sep. 13, 2021, the entire contents of which are incorporated herein by reference.

FIELD

The embodiments discussed herein are related to a signal processing device and a transmission device.

BACKGROUND

For example, a technique is disclosed in which, among optical signals of a plurality of channels included in wavelength division multiplexed optical signals subjected to digital coherent optical transmission, the power of an optical signal of a predetermined channel is measured based on the gain of an amplifier that amplifies an electrical signal obtained by optical-to-electrical conversion of the optical signal.

Japanese Laid-open Patent Publication No. 2015-214384 is disclosed as related art.

SUMMARY

According to an aspect of the embodiments, a signal processing device includes: a first conversion circuit that, among optical signals of a plurality of channels included in wavelength division multiplexed optical signals, converts electric field signals that indicate electric field components of the optical signal of a predetermined channel received in a receiving bandwidth wider than a frequency interval of optical signals of the plurality of channels, from time domain signals into frequency domain signals; a filter circuit that passes the electric field signals converted into the frequency domain signals with a passband narrower than the receiving bandwidth; a second conversion circuit that converts the electric field signals passed by the filter circuit, from the frequency domain signals into the time domain signals; an amplitude measurement circuit that measures first amplitudes of the electric field signals input to the filter circuit from the first conversion circuit and second amplitudes of the electric field signals input to the second conversion circuit from the filter circuit, individually; and a notification circuit that notifies a power measurement device that measures power of the optical signal of the predetermined channel, of the first amplitudes and the second amplitudes used in correction of a measurement error of the power of the optical signal of the predetermined channel.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

There is a variable baud rate digital coherent optical receiver capable of selecting an appropriate baud rate according to the transmission distance and transmission capacity of the optical signal, from among a plurality of baud rates. This type of digital coherent optical receiver is provided with optical parts and electrical parts that support the receiving bandwidth of the optical signal at the maximum selectable baud rate.

When a baud rate lower than the maximum baud rate is selected, the frequency bandwidth of the received optical signal is narrower than the receiving bandwidth. In this case, in the digital coherent optical receiver, since not only the optical signal of the predetermined channel to be received but also a optical signal component of an adjacent channel is included, there is a possibility of an error occurring in the measured value of the power of the optical signal of the predetermined channel.

Thus, it is an object of the present embodiments to provide a signal processing device and a transmission device capable of reducing a measurement error in the power of optical signal of a predetermined channel.

(Configuration of Wavelength Division Multiplexing Device and Transponder)

Figure 1:
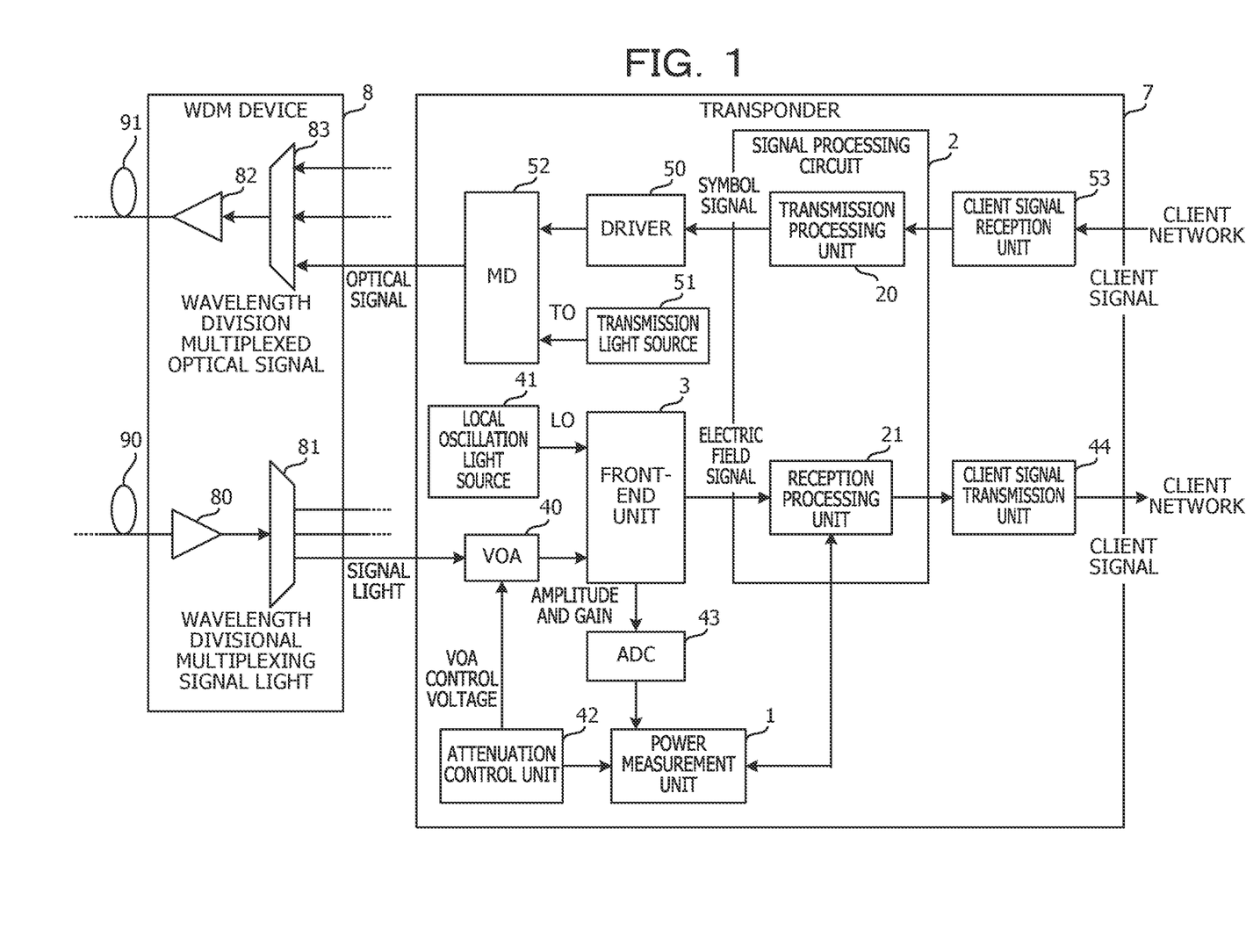
FIG. 1 is a configuration diagram illustrating an example of a wavelength division multiplexing device and a transponder.

FIG. 1 is a configuration diagram illustrating an example of a wavelength division multiplexing (WDM) device 8 and a transponder 7. The WDM device 8 is provided at a node of an optical network and transmits and receives wavelength division multiplexed optical signal to and from another node. The wavelength division multiplexed optical signal includes a plurality of optical signals having frequencies different from each other. The frequency intervals between the individual optical signals are fixed, and each optical signal is assigned with a channel in the optical network according to the frequency.

The WDM device 8 includes a preamplifier 80, a demultiplexer 81, a post amplifier 82, and a multiplexer 83. The wavelength division multiplexed optical signal is input to the preamplifier 80 from a transmission line 90 such as an optical fiber linking another node. The preamplifier 80 is, for example, an erbium doped fiber amplifier (EDFA) and amplifies the wavelength division multiplexed optical signal.

The wavelength division multiplexed optical signal is input to the demultiplexer 81 from the preamplifier 80. The demultiplexer 81 demultiplexes the wavelength division multiplexed optical signal for the transponder 7 and other transponders (not illustrated).

In addition, optical signal is input to the multiplexer 83 from the transponder 7 and other transponders. The multiplexer 83 generates wavelength division multiplexed optical signal by performing wavelength division multiplexing on the optical signal. The wavelength division multiplexing optical signal is input to the post amplifier 82 from the multiplexer 83. The post amplifier 82 is, for example, an EDFA and amplifies the wavelength division multiplexed optical signal to output the amplified wavelength division multiplexed optical signal to a transmission line 91 such as an optical fiber linking another node.

The transponder 7 is connected to the WDM device 8 via an optical fiber or the like. The transponder 7 includes a power measurement unit 1, a signal processing circuit 2, a front-end unit 3, a variable optical attenuator (VOA) 40, a local oscillation light source 41, an attenuation control unit 42, an analog-to-digital converter (ADC) 43, and a client signal transmission unit 44. Furthermore, the transponder 7 includes a driver 50, a transmission light source 51, an optical modulator (MD) 52, and a client signal reception unit 53. Note that the transponder 7 is an example of a transmission device.

The client signal reception unit 53 receives a client signal from a client network such as a local area network (LAN). Examples of the client signal include, but are not limited to, an Ethernet (registered trademark, the same applies hereinafter) signal. The client signal reception unit 53 converts the client signal from an optical signal into an electrical signal to output the converted client signal to the signal processing circuit 2. Note that the client signal reception unit 53 is implemented by an optical-electrical converter and an integrated circuit such as a field programmable gate array (FPGA) or an application specified integrated circuit (ASIC).

In addition, a client signal is input to the client signal transmission unit 44 from the signal processing circuit 2. The client signal transmission unit 44 converts the client signal from an electrical signal into an optical signal to transmit the converted client signal to the client network. Note that the client signal transmission unit 44 is implemented by an electrical-optical converter and an integrated circuit such as an FPGA or ASIC.

The signal processing circuit 2 includes a transmission processing unit 20 and a reception processing unit 21. The signal processing circuit 2 is implemented by, but is not limited to, a digital signal processor (DSP), for example, and is implemented by an integrated circuit such as an FPGA or ASIC. Note that the signal processing circuit 2 is an example of a signal processing device.

The signal processing circuit 2 is capable of selecting an appropriate baud rate from among a plurality of baud rates according to the transmission distance and transmission capacity of optical signal of a predetermined channel CHi, in accordance with an instruction from a monitoring control device (not illustrated). The transmission processing unit 20 and the reception processing unit 21 perform optical signal transmission processing and reception processing, respectively, according to the selected baud rate.

The transmission processing unit 20 generates a symbol signal by mapping a symbol according to a multi-level modulation scheme such as quadrature amplitude modulation (QAM) to the client signal. In addition, the transmission processing unit 20 may perform coding processing by forward error correction (FEC) or the like on the client signal. The transmission processing unit 20 converts the symbol signal from a digital signal to an analog signal to output the converted symbol signal to the driver 50. The driver 50 converts the symbol signal into an optical modulation drive signal to output the converted drive signal to the optical modulator 52.

The drive signal is input to the optical modulator 52 from the driver 50, and transmission light TO is input to the optical modulator 52 from the transmission light source 51. The transmission light source 51 is implemented by, for example, a laser diode. The optical modulator 52 includes, for example, a Mach-Zehnder interferometer and optically modulates the transmission light TO based on the drive signal. The optically modulated transmission light is input to the multiplexer 83 from the optical modulator 52 as optical signal.

In addition, the optical signal of the predetermined channel CHi demultiplexed by the demultiplexer 81 is input to the VOA 40. The attenuation control unit 42 controls the attenuation amount of the VOA 40 based on a VOA control voltage such that the power of the optical signal does not exceed an upper limit value. The VOA 40 attenuates the optical signal by an attenuation amount in accordance with the VOA control voltage instructed by the attenuation control unit 42. The optical signal is input to the front-end unit 3 from the VOA 40. Note that the VOA control voltage is an example of a control voltage.

The front-end unit 3 detects the optical signal by local oscillation light LO input from the local oscillation light source 41. The local oscillation light source 41 is implemented by, for example, a laser diode. The center frequency of the local oscillation light LO matches the center frequency of the optical signal.

In addition, the front-end unit 3 optical-to-electrical converts the detected optical signal into an electrical signal. The electrical signal is an electric field signal indicating an electric field component of the optical signal. The front-end unit 3 amplifies the electric field signal to output the amplified electric field signal to the reception processing unit 21. At this time, the front-end unit 3 notifies the power measurement unit 1 via the ADC 43 of each of monitor values of the gain when the electric field signal was amplified and the amplitude of the amplified electric field signal. The ADC 43 converts a signal indicating the amplitude and the gain from an analog signal to a digital signal.

The power measurement unit 1 is an example of a power measurement device and measures the power of the optical signal of the predetermined channel CHi. The power measurement unit 1 calculates the power based on the gain notified by the front-end unit 3 and, when the gain satisfies a predetermined condition, corrects the power based on the amplitude notified by the front-end unit 3.

In addition, the power measurement unit 1 acquires the VOA control voltage for the VOA 40 from the attenuation control unit 42. When the VOA control voltage satisfies a predetermined condition, the power measurement unit 1 corrects the power based on the VOA control voltage.

In addition, as described earlier, since the reception processing unit 21 performs the reception processing with a variable baud rate, the front-end unit 3 and the reception processing unit 21 have a receiving bandwidth supporting the maximum selectable baud rate. Accordingly, when the signal processing circuit 2 selects a baud rate lower than the maximum baud rate, the frequency bandwidth of the received optical signal of the predetermined channel CHi is narrower than the receiving bandwidth. In this case, in a digital coherent optical receiver, since not only the optical signal of the predetermined channel CHi to be received but also optical signal components of adjacent channels CH(i+1) and CH(i−1) are included, there is a possibility of an error occurring in the measured value of the power of the optical signal of the predetermined channel CHi.

Thus, by communicating with the reception processing unit 21, the power measurement unit 1 corrects the power measurement error according to the signal components of the adjacent channels CH(i+1) and CH(i−1) included in the electric field signals. Note that the details of a power measurement approach and a correction approach will be described later.

(Configuration of Front-End Unit)

Figure 2:
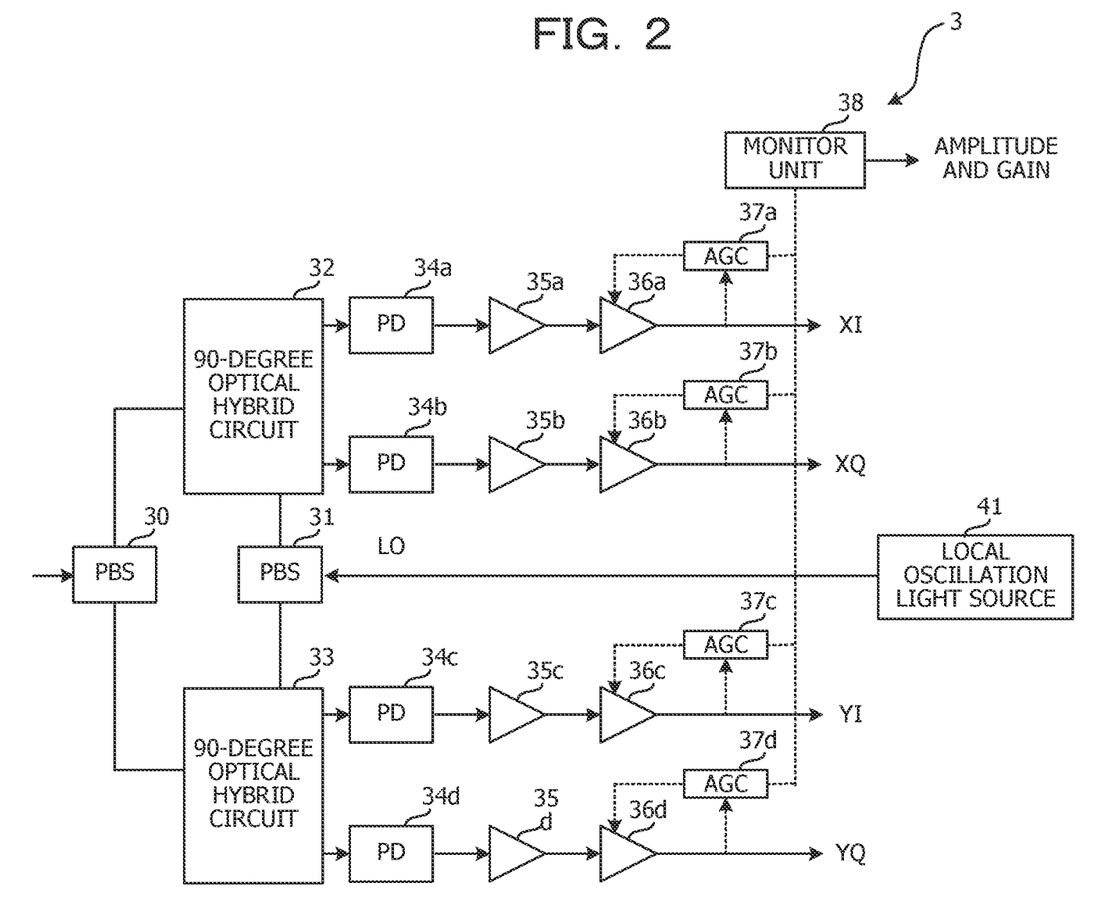
FIG. 2 is a configuration diagram illustrating an example of a front-end unit.

FIG. 2 is a configuration diagram illustrating an example of the front-end unit 3. The front-end unit 3 includes polarizing beam splitters (PBSs) 30 and 31, 90-degree optical hybrid circuits 32 and 33, balanced photodiodes (PDs) 34a to 34d, and a transimpedance amplifiers (hereinafter denoted as "TIAs") 35a to 35d. Note that the front-end unit 3 is an example of a optical receiving unit that outputs the electric field signals that indicate the electric field components of the optical signal of the predetermined channel CHi.

In addition, the front-end unit 3 includes variable gain amplifiers 36a to 36d, automatic gain controllers (AGC) 37a to 37d, and a monitor unit 38. Note that, in this example, polarization multiplexed optical signal with the X-polarization component and the Y-polarization component will be cited as the optical signal, but the optical signal is not limited to this.

The optical signal is input to the PBS 30 from the VOA 40. The PBS 30 separates a burst optical signal into the X-polarization component and the Y-polarization component to output the separated X-polarization component and Y-polarization component to the 90-degree optical hybrid circuits 32 and 33, respectively. In addition, the local oscillation light LO is input to the other PBS 31 from the local oscillation light source 41. The PBS 31 separates the local oscillation light LO into the X-polarization component and the Y-polarization component to output the separated X-polarization component and Y-polarization component to the 90-degree optical hybrid circuits 32 and 33, respectively.

The 90-degree optical hybrid circuit 32 includes a waveguide for causing the X-polarization component of the optical signal and the X-polarization component of the local oscillation light LO to interfere with each other and detects the X-polarization component of the optical signal. The 90-degree optical hybrid circuit 32 outputs optical components according to the amplitudes and phases of the in-phase component and the quadrature phase component, to the PDs 34a and 34b, respectively, as a detection result.

The 90-degree optical hybrid circuit 33 includes a waveguide for causing the Y-polarization component of the optical signal and the Y-polarization component of the local oscillation light LO to interfere with each other and detects the Y-polarization component of the optical signal. The 90-degree optical hybrid circuit 33 outputs optical components according to the amplitudes and phases of the in-phase component and the quadrature phase component, to the PDs 34c and 34d, respectively, as a detection result.

In this manner, the 90-degree optical hybrid circuits 32 and 33 detect the optical signal of the predetermined channel CHi by the local oscillation light LO. Therefore, the front-end unit 3 is allowed to detect and receive the optical signal of the predetermined channel CHi from the wavelength division multiplexed optical signal obtained by performing wavelength division multiplexing on optical signals of a plurality of channels, according to the center frequency of the local oscillation light LO.

The PDs 34a to 34d convert the optical components input from the 90-degree optical hybrid circuits 32 and 33 into electrical analog signals. The PDs 34a to 34d individually output the analog signals individually to the TIAs 35a to 35d. Note that each of the analog signals is a differential signal.

The TIAs 35a to 35d amplify the analog signals to convert the amplified analog signals from current signals to voltage signals. The TIAs 35a to 35d individually output the converted analog signals to the variable gain amplifiers 36a to 36d.

The variable gain amplifiers 36a to 36d amplify the analog signals based on the variable gains individually controlled by the AGCs 37a to 37d. The variable gain amplifier 36a outputs the analog signal to the reception processing unit 21 as an electric field signal XI indicating an electric field of the in-phase component of the X-polarization of the optical signal. The variable gain amplifier 36b outputs the analog signal to the reception processing unit 21 as an electric field signal XQ indicating an electric field of the quadrature phase component of the X-polarization of the optical signal.

The variable gain amplifier 36c outputs the analog signal to the reception processing unit 21 as an electric field signal YI indicating an electric field of the in-phase component of the Y-polarization of the optical signal. The variable gain amplifier 36d outputs the analog signal to the reception processing unit 21 as an electric field signal YQ indicating an electric field of the quadrature phase component of the Y-polarization of the optical signal.

The AGCs 37a to 37d detect the respective amplitudes of the electric field signals XI, XQ, YI, and YQ output from the variable gain amplifiers 36a to 36d. The AGCs 37a to 37d individually control the gains of the variable gain amplifiers 36a to 36d such that the respective amplitudes of the electric field signals XI, XQ, YI, and YQ coincide with a target value. This makes the respective amplitudes of the electric field signals XI, XQ, YI, and YQ substantially the same. Here, the target value of the amplitude is designated according to, for example, the signal input specifications of the reception processing unit 21. Note that the variable gain amplifiers 36a to 36d are examples of amplifiers that amplify the electric field signals XI, XQ, YI, and YQ such that the amplitudes of the electric field signals XI, XQ, YI, and YQ coincide with a predetermined value.

The monitor unit 38 collects the gains of the variable gain amplifiers 36a to 36d and the amplitudes (peak indicators) detected by the respective variable gain amplifiers 36a to 36d, from the respective variable gain amplifiers 36a to 36d. Note that the gains and amplitudes collected by the monitor unit 38 will be denoted as "gain monitor values" and "amplitude monitor values", respectively. The monitor unit 38 notifies the power measurement unit 1 of the amplitude monitor values and the gain monitor values. Note that the monitor unit 38 is implemented by, for example, an analog circuit that converts the amplitude and gain into a direct-current voltage, or a digital integrated circuit such as an FPGA or ASIC.

(Power Measurement Example)

Figure 3:
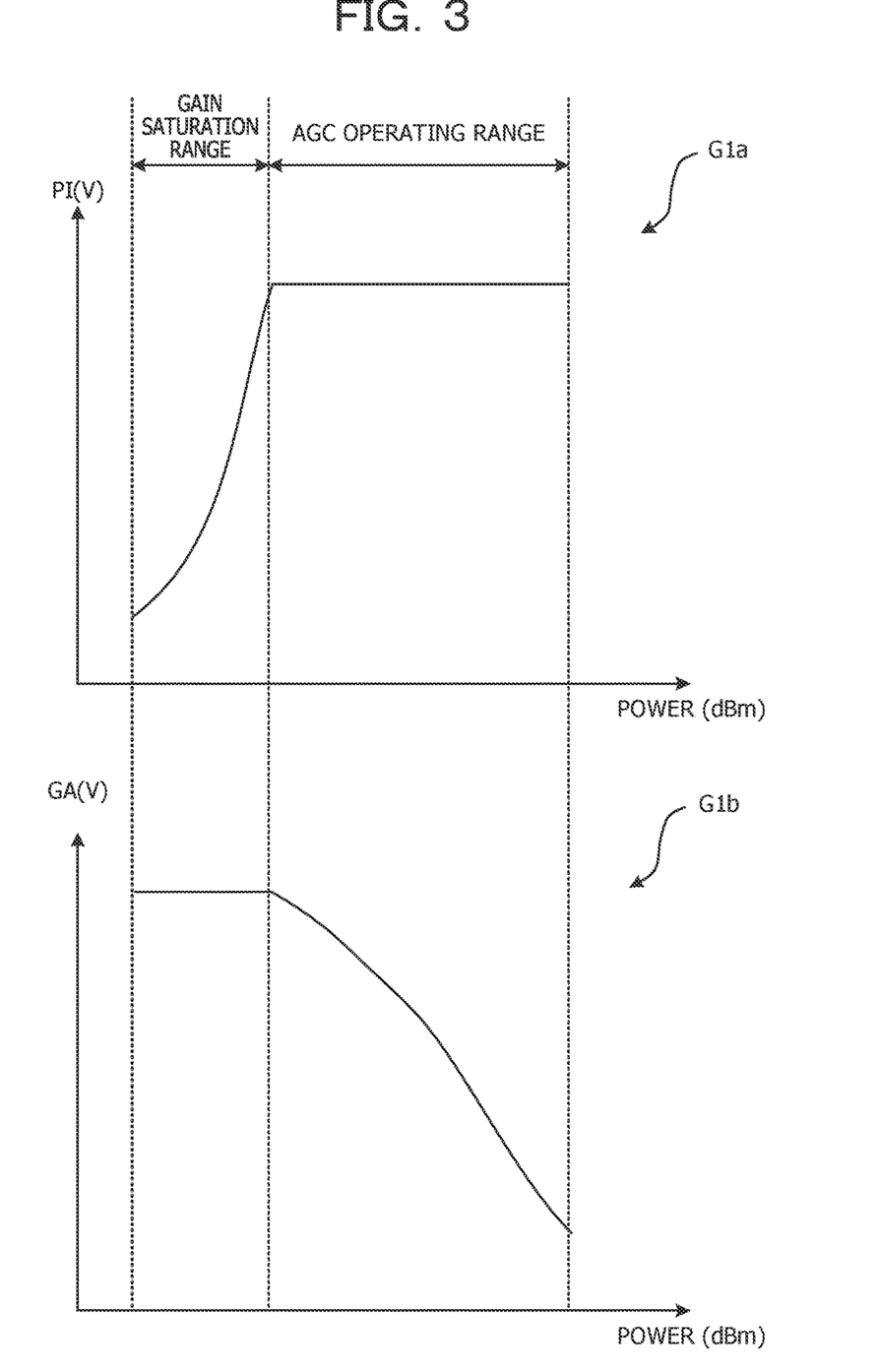
FIG. 3 is a diagram illustrating an example of the relationship between the power of optical signal and the amplitudes and gains of electric field signals.

FIG. 3 is a diagram illustrating an example of the relationship between the power of the optical signal and the amplitude monitor values (PI(V)) and the gain monitor values (GA(V)) of the electric field signals XI, XQ, YI, and YQ. The reference sign G1a indicates the change in the amplitude monitor values of the electric field signals XI, XQ, YI, and YQ with respect to the power of the optical signal when the attenuation amount of the VOA 40 is not taken into consideration. In addition, the reference sign G1b indicates the change in the gain monitor values of the variable gain amplifiers 36a to 36d with respect to the power of the optical signal when the attenuation amount of the VOA 40 is not taken into consideration.

In the control range of the AGCs 37a to 37d (AGC operating range), the amplitudes coincide with the target value. Meanwhile, the gains decrease as the power increases.

$$P_{GA}=f_{GA}(V_{GA}) \quad (1)$$

In the AGC operating range, the power measurement unit 1 calculates power $P_{GA}$ based on a gain monitor value $V_{GA}$, for example, by above formula (1). Here, the function $f_{GA}(V_{GA})$ is designated from the relationship between the gain monitor value $V_{GA}$ and the power $P_{GA}$ obtained from, for example, actual measurement or simulation.

Outside the control range (in the gain saturation range) of the AGCs 37a to 37d, the gains have a fixed saturation value. Meanwhile, the amplitudes decrease as the power decreases. Here, the power measurement unit 1 discriminates between the AGC operating range and the gain saturation range based on the comparison result between the gain monitor value $V_{GA}$ and a predetermined threshold value Vth.

$$P_{PI}=f_{PI}(V_{PI}) \quad (2)$$

In the gain saturation range ($V_{GA}$>Vth), the power measurement unit 1 calculates a correction value $P_{PI}$ of the power $P_{GA}$ based on the amplitude monitor value $V_{PI}$, for example, by above formula (2). Here, the function $f_{PI}(V_{PI})$ is designated from the relationship between the amplitude monitor value $V_{PI}$ and the correction value $P_{PI}$ of the power $P_{GA}$ obtained from, for example, actual measurement or simulation. Note that the correction value $P_{PI}$ is zero in the AGC operating range ($V_{GA}$≤Vth).

$$P=P_{GA}+P_{PI} \quad (3)$$

Accordingly, the power measurement unit 1 calculates power P as the sum of the power $P_{GA}$ calculated from the gain and the correction value $P_{PI}$ based on the amplitude monitor value $V_{PI}$, as in above formula (3).

Figure 4:
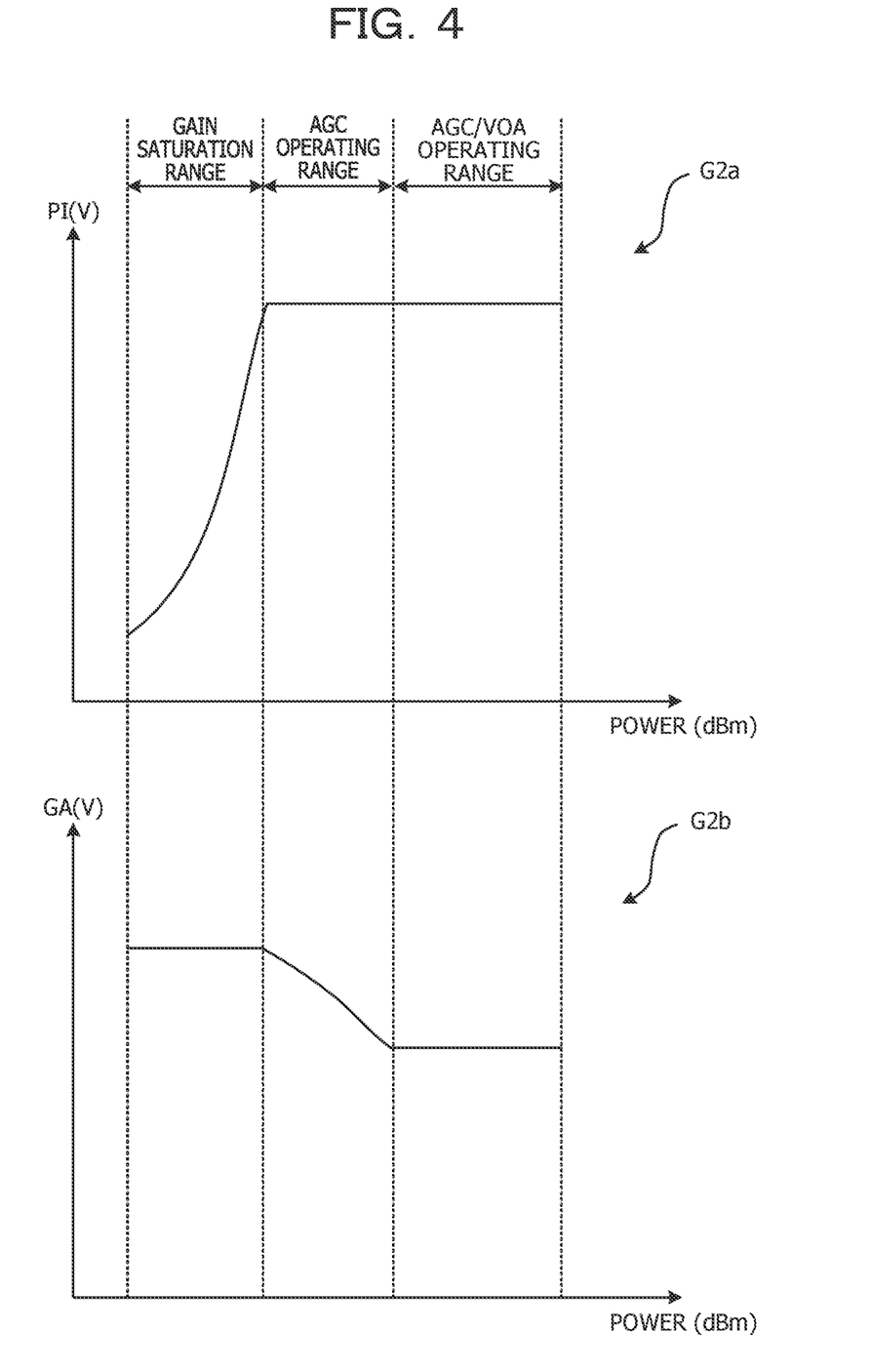
FIG. 4 is a diagram illustrating another example of the relationship between the power of optical signal and the amplitudes and gains of electric field signals.

FIG. 4 is a diagram illustrating another example of the relationship between the power of the optical signal and the amplitude monitor values (PI(V)) and the gain monitor values (GA(V)) of the electric field signals XI, XQ, YI, and YQ. The reference sign G2a indicates the change in the amplitude monitor values of the electric field signals XI, XQ, YI, and YQ with respect to the power of the optical signal when the attenuation amount of the VOA 40 is taken into consideration. In addition, the reference sign G2b indicates the change in the gain monitor values of the variable gain amplifiers 36a to 36d with respect to the power of the optical signal when the attenuation amount of the VOA 40 is taken into consideration.

In the control range of the AGCs 37a to 37d and the VOA 40 (AGC/VOA operating range), the amplitudes coincide with the target value. Meanwhile, the gains coincide with a predetermined value because the power is kept at an upper limit value by the VOA 40.

$$L_{VOA}=f_{VOA}(V_{VOA}) \quad (4)$$

In the AGC/VOA operating range, the power measurement unit 1 calculates a correction value $L_{VOA}$ for the power loss, based on a VOA control voltage $V_{VOA}$ for the VOA 40, for example, by above formula (4). Here, the function $f_{VOA}(V_{VOA})$ is designated from the relationship between the VOA control voltage $V_{VOA}$ and the attenuation amount of light that has passed through the VOA, which is obtained from, for example, actual measurement or simulation.

$$P=P_{GA}+P_{PI}+L_{VOA} \quad (5)$$

Accordingly, the power measurement unit 1 calculates the power P as the sum of the power $P_{GA}$ calculated from the gain monitor value $V_{GA}$, the correction value $P_{PI}$ based on the amplitude monitor value $V_{PI}$, and the correction value $L_{VOA}$ based on the VOA control voltage $V_{VOA}$, as in above formula (5). Note that the power measurement unit 1 may calculate the power P from one of the gain monitor values $V_{GA}$ and one of the amplitude monitor values $V_{PI}$ of the electric field signals XI, XQ, YI, and YQ, or may calculate the power P from an average gain monitor value $V_{GA}$ and an average amplitude monitor value $V_{PI}$ of the electric field signals XI, XQ, YI, and YQ.

In addition, as described earlier, by communicating with the reception processing unit 21, the power measurement unit 1 further corrects the power measurement error according to the signal components of the adjacent channels CH(i+1) and CH(i−1) included in the electric field signals. The details of the correction approach will be described below.

(Spectrum of Wavelength Division Multiplexing Optical Signal)

Figure 5:
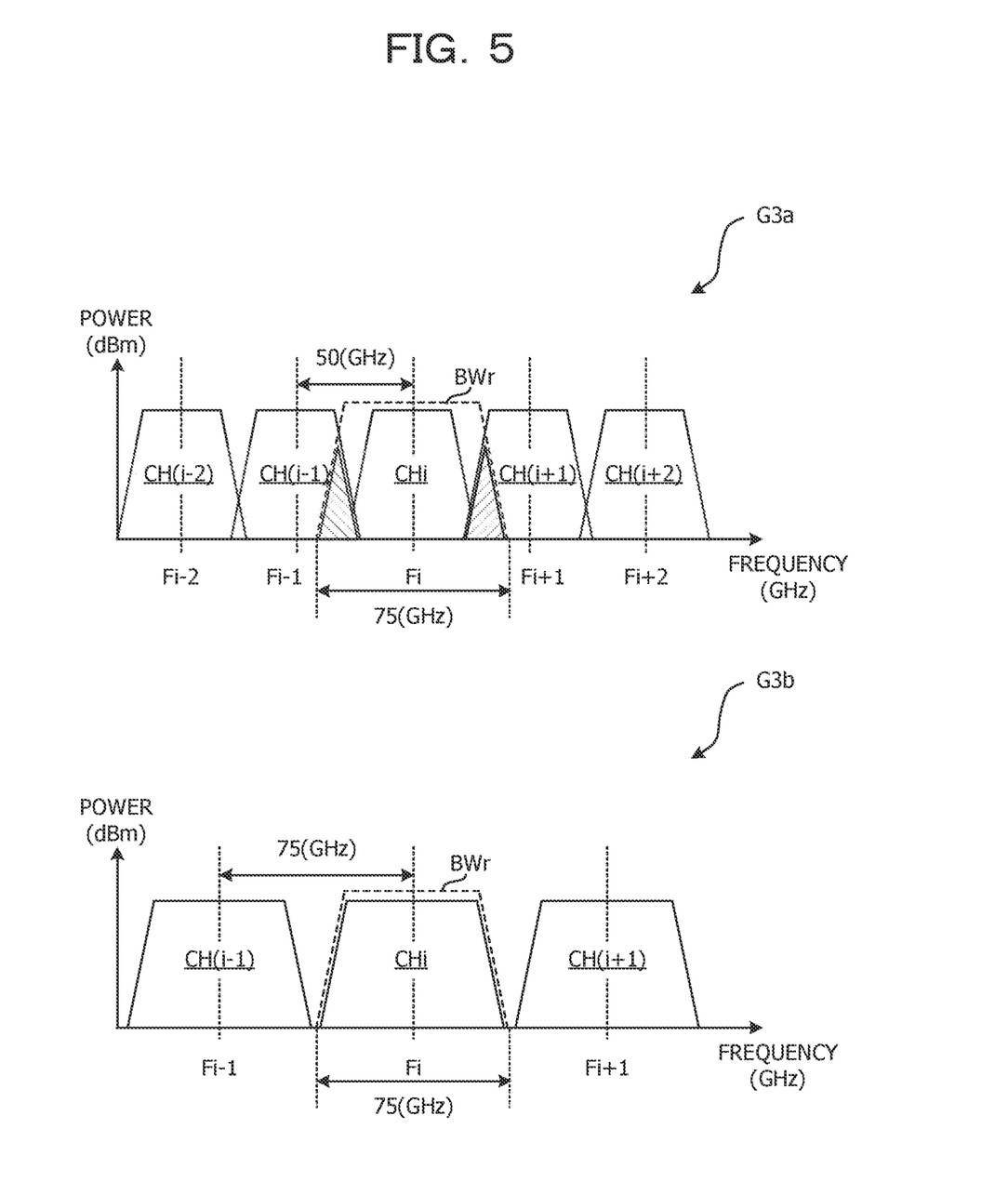
FIG. 5 is a diagram illustrating an example of spectrum of wavelength division multiplexed optical signal.

FIG. 5 is a diagram illustrating an example of spectrum of wavelength division multiplexed optical signal. In FIG. 5, the horizontal axis indicates the frequency (GHz), and the vertical axis indicates the power (dBm) of the optical signal. The reference sign G3a indicates a spectrum when the bandwidth of the optical signal of each of channels CH(i−2) to CH(i+2) is narrower than a receiving bandwidth BWr of the transponder 7.

As an example, it is assumed that the interval between center frequencies Fi−2 to Fi+2 of the respective optical signals is 50 (GHz), and the receiving bandwidth BWr is 75 (GHz). For example, each optical signal is arranged on the frequency axis at a grid interval of 50 (GHz), and the signal processing circuit 2 selects a baud rate of 50 (GHz) according to the frequency interval of the optical signal. In addition, the transponder 7 has the receiving bandwidth BWr capable of receiving optical signal having a grid interval of 75 (GHz) wider than the frequency interval of the optical signal.

Therefore, the receiving bandwidth BWr includes not only the optical signal of the predetermined channel CHi but also the optical signal components of the adjacent channels CH(i+1) and CH(i−1) (refer to the shaded areas). Accordingly, when the power measurement unit 1 calculates the power P by above formulas (1) to (5), a possibility of the occurrence of a measurement error arises.

In addition, the reference sign G3b indicates a spectrum when the bandwidth of the optical signal of each of the channels CH(i−2) to CH(i+2) matches the receiving bandwidth BWr of the transponder 7. As an example, it is assumed that the interval between center frequencies Fi−2 to Fi+2 of the respective optical signals is 75 (GHz), and the receiving bandwidth BWr is 75 (GHz). For example, each optical signal is arranged on the frequency axis at a grid interval of 75 (GHz), and the signal processing circuit 2 selects a baud rate of 75 (GHz) according to the frequency interval of the optical signal.

In this case, the receiving bandwidth BWr includes only the optical signal of the predetermined channel CHi and does not include the optical signal component of the adjacent channels CH(i+1) and CH(i−1). Accordingly, the power measurement unit 1 is allowed to measure the power with high accuracy even if the power P is calculated by above formulas (1) to (5).

Consequently, as indicated by the reference sign G3a, the power measurement unit 1 determines a case where the electric field signals XI, XQ, YI, and YQ indicating the electric field components of the optical signal of the predetermined channel CHi to be received in the receiving bandwidth BWr wider than the frequency interval of each optical signal are input to the reception processing unit 21, based on the baud rate selected by the reception processing unit 21. In this case, by communicating with the reception processing unit 21, the power measurement unit 1 corrects the power measurement error according to the signal components of the adjacent channels CH(i+1) and CH(i−1) included in the electric field signals.

(Configuration of Reception Processing Unit)

Figure 6:
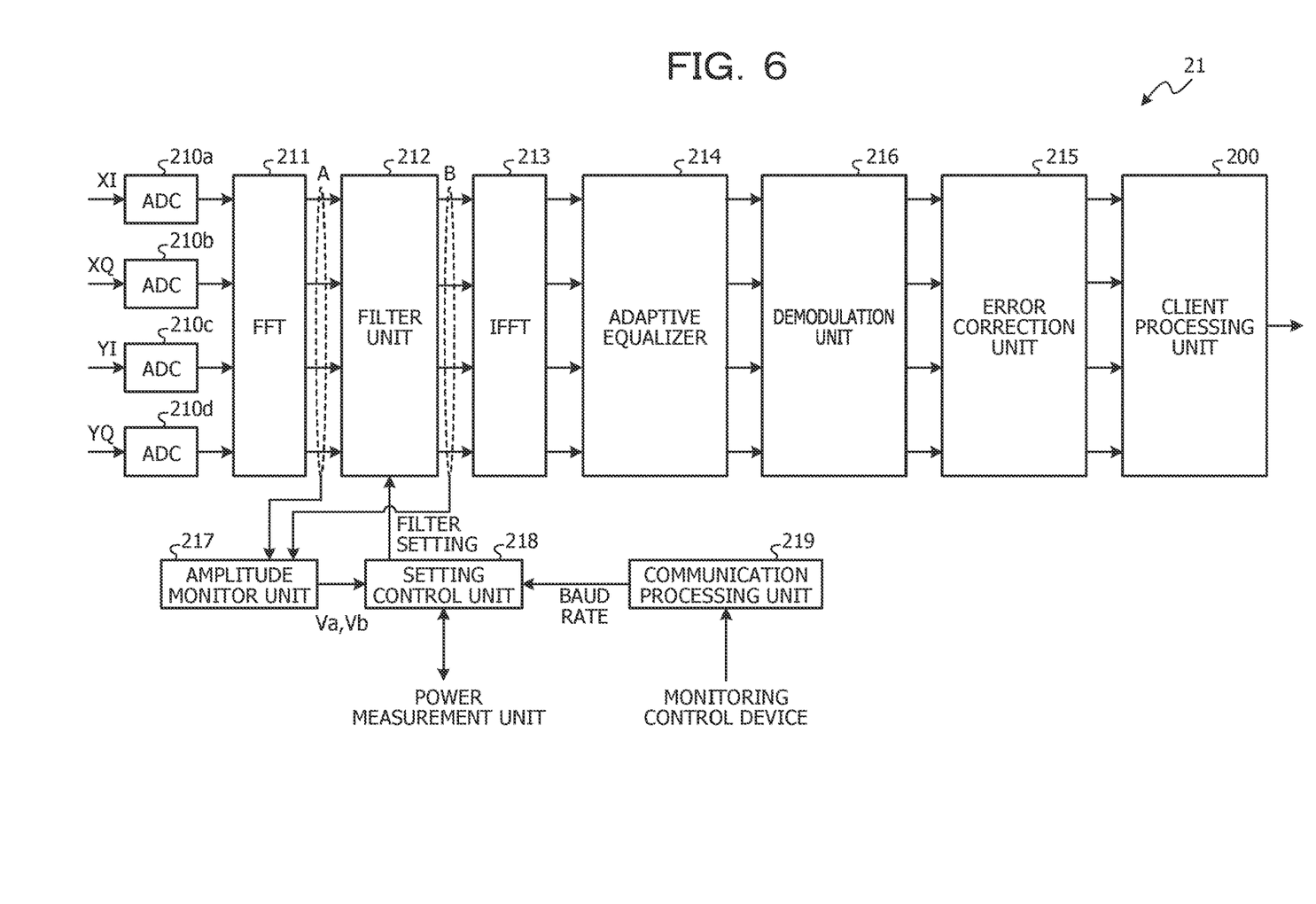
FIG. 6 is a configuration diagram illustrating an example of a reception processing unit.

FIG. 6 is a configuration diagram illustrating an example of the reception processing unit 21. The reception processing unit 21 includes an analog-to-digital converters (ADCs) 210a to 210d, a fast Fourier transformation (FFT) unit 211, a filter unit 212, and an inverse fast Fourier transformation (IFFT) unit 211. The reception processing unit 21 further includes an adaptive equalizer 214, a demodulation unit 216, an error correction unit 215, a client processing unit 200, an amplitude monitor unit 217, a setting control unit 218, and a communication processing unit 219.

The ADCs 210a to 210d individually convert the electric field signals XI, XQ, YI, and YQ input from the front-end unit 3, from analog signals to digital signals. The electric field signals XI, XQ, YI, and YQ are input to the FFT unit 211 from the ADCs 210a to 210d.

The FFT unit 211 is an example of a first conversion unit and converts the electric field signals XI, XQ, YI, and YQ from time domain signals to frequency domain signals. The electric field signals XI, XQ, YI, and YQ are input to the filter unit 212 from the FFT unit 211.

The filter unit 212 is a frequency domain equalizer (FDE) that performs equalization, for example, by multiplication by inverse characteristics of the transfer function of the transmission line 90 in the frequency domain, and is also used as a filter. The setting control unit 218 performs filter setting on the filter unit 212. The filter unit 212 sets, for example, a tap coefficient that designates the shape of the passband of the filter unit 212, based on the filter setting.

The filter unit 212 filters the electric field signals XI, XQ, YI, and YQ with the passband. The filter unit 212 shapes the frequency response for the electric field signals XI, XQ, YI, and YQ such that the spectrum are flattened. The electric field signals XI, XQ, YI, and YQ are input to the IFFT unit 213 from the filter unit 212.

The IFFT unit 213 is an example of a second conversion unit and converts the electric field signals XI, XQ, YI, and YQ passed by the filter unit 212, from the frequency domain signals to the time domain signals. The electric field signals XI, XQ, YI, and YQ are input to the adaptive equalizer 214 from the IFFT unit 213.

The adaptive equalizer 214 adaptively compensates the electric field signals XI, XQ, YI, and YQ for the deterioration of the optical signal that changes with time in the transmission line 90. As the cause of this deterioration, the polarization mode dispersion (PMD) or the like is mainly cited. The electric field signals XI, XQ, YI, and YQ are input to the demodulation unit 216 from the adaptive equalizer 214.

The demodulation unit 216 demodulates the electric field signals XI, XQ, YI, and YQ by compensating the frequency difference and phase difference between the optical signal and the local oscillation light LO. The electric field signals XI, XQ, YI, and YQ are output to the error correction unit 215 from the demodulation unit 216.

The error correction unit 215 reproduces a data signal and corrects an error by, for example, performing decoding processing by FEC on the electric field signals XI, XQ, YI, and YQ. The data signal is input to the client processing unit 200 from the error correction unit 215.

The client processing unit 200 performs demapping processing on the data signal mapped to a frame such as an optical transport network (OTN). This converts the data signal into the original client signal. The client signal is output to the client signal transmission unit 44.

The communication processing unit 219 receives a baud rate instruction signal from the monitoring control device (not illustrated). The communication processing unit 219 notifies the setting control unit 218 of the baud rate. The setting control unit 218 sets the baud rate in the entire signal processing circuit 2.

The setting control unit 218 notifies the power measurement unit 1 of the baud rate. The power measurement unit 1 determines whether or not a correction for removing the signal components of the adjacent channels CH(i−1) and CH(i+1) from the power of the optical signal is to be involved, based on the baud rate. When it is determined that the correction is to be involved, the power measurement unit 1 instructs the setting control unit 218 to execute bandwidth limitation that narrows the passband of the filter unit 212.

The setting control unit 218 makes the passband of the filter unit 212 narrower than the receiving bandwidth BWr in accordance with the bandwidth limitation instruction. This removes the signal components of the adjacent channels CH(i−1) and CH(i+1) from the electric field signals XI, XQ, YI, and YQ.

Figure 7:
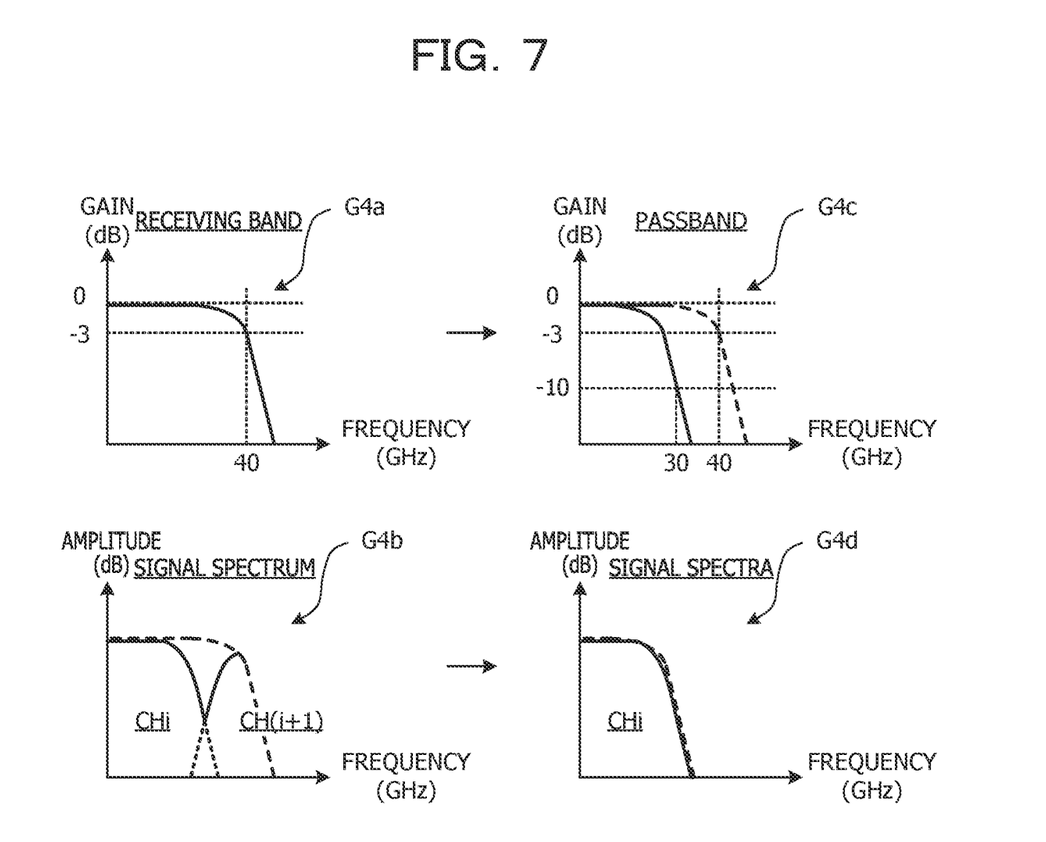
FIG. 7 is a diagram illustrating an example of changes in signal spectrum due to bandwidth limitation.

FIG. 7 is a diagram illustrating an example of changes in signal spectrum due to the bandwidth limitation. Note that, although only one sideband of the signal is illustrated in FIG. 7, signal processing such as inverse fast Fourier transformation as an example is performed on both sidebands.

The reference sign G4a indicates the spectrum of the receiving bandwidth BWr of the transponder 7. The horizontal axis indicates the frequency (GHz), and the vertical axis indicates the gain (dB). As an example, the receiving bandwidth BWr is provided with a bandwidth of −3 (dB) for 40 (GHz) according to a grid of 75 (GHz) (64 (Gbd)).

The reference sign G4b indicates the signal spectrum of the electric field signals XI, XQ, YI, and YQ before being passed by the filter unit 212. The horizontal axis indicates the frequency (GHz), and the vertical axis indicates the amplitude (dB). The broken line indicates the receiving bandwidth BWr. The electric field signals XI, XQ, YI, and YQ correspond to optical signal of a grid of 50 (GHz) (32 (Gbd)) as an example. The signal spectrum include the signal component of the predetermined channel CHi and the signal component of the adjacent channel CH(i+1).

The reference sign G4c indicates the shape of the passband of the filter unit 212. The horizontal axis indicates the frequency (GHz), and the vertical axis indicates the gain (dB). The setting control unit 218 sets the filter unit 212 such that a passband that removes the signal components of, for example, 30 (GHz) or higher from the electric field signals XI, XQ, YI, and YQ is formed. The setting control unit 218 sets a filter coefficient of the filter unit 212 such that a passband that has a frequency bandwidth of 30 (GHz) with respect to a gain of −10 (dB) is formed as an example. In addition, the broken line depicts the shape of the passband when the bandwidth limitation is not executed and matches the receiving bandwidth BWr. This makes the passband of the filter unit 212 be a bandwidth according to the frequency interval (50 (GHz)) of the optical signal.

The reference sign G4d indicates the signal spectrum of the electric field signals XI, XQ, YI, and YQ after being passed by the filter unit 212. The horizontal axis indicates the frequency (GHz), and the vertical axis indicates the amplitude (dB). The broken line indicates the shape of the passband. The filter unit 212 removes the signal component of the adjacent channel CH(i+1) from the electric field signals XI, XQ, YI, and YQ. Therefore, the electric field signals XI, XQ, YI, and YQ substantially include only the signal component of the predetermined channel CHi.

In this manner, the filter unit 212 passes the electric field signals XI, XQ, YI, and YQ with the passband according to the frequency interval of the optical signal. Therefore, the filter unit 212 may effectively remove the signal component of the adjacent channel CH(i+1) from the electric field signals XI, XQ, YI, and YQ.

Referring to FIG. 6 again, the amplitude monitor unit 217 is an example of an amplitude measurement unit and measures each of amplitudes Va of the electric field signals XI, XQ, YI, and YQ (refer to the reference sign A) input to the filter unit 212 from the FFT unit 211 and amplitudes Vb of the electric field signals XI, XQ, YI, and YQ (refer to the reference sign B) input to the IFFT unit 213 from the filter unit 212. For example, the amplitude monitor unit 217 measures the amplitudes Va and Vb of the electric field signals XI, XQ, YI and YQ in the preceding stage and the subsequent stage of the filter unit 212.

Here, the amplitude monitor unit 217 may measure any of amplitudes Va and Vb of the electric field signals XI, XQ, YI, and YQ, or may measure average amplitudes Va and Vb of the electric field signals XI, XQ, YI, and YQ. The amplitude Va is the amplitude before being passed by the filter unit 212, and the amplitude Vb is the amplitude after being passed by the filter unit 212. Note that the amplitude Va is an example of a first amplitude, and the amplitude Vb is an example of a second amplitude.

The amplitude monitor unit 217 notifies the setting control unit 218 of the amplitudes Va and Vb. At this time, the amplitude monitor unit 217 may calculate the root mean squares (RMSs) for each of the amplitudes Va and Vb to make a notification of the calculated RMS. This allows the setting control unit 218 to acquire the time averages of the amplitudes Va and Vb.

After executing the bandwidth limitation on the filter unit 212, the setting control unit 218 notifies the power measurement unit 1 of the amplitudes Va and Vb. The power measurement unit 1 uses the amplitudes Va and Vb to correct the power measurement error of the optical signal. Note that the setting control unit 218 is an example of a notification unit.

(Power Correction Based on Amplitudes of Electric Field Signals)

The power measurement unit 1 corrects the power calculated by above formulas (1) to (5), based on the ratio of the amplitudes Va and Vb.

$$L_{FEQ}=10 \log(Vb/Va) \quad (6)$$

$$G=f_{FEQ}(L_{FEQ}) \quad (7)$$

The power measurement unit 1 calculates voltage losses $L_{FEQ}$ (dB) of the electric field signals XI, XQ, YI, and YQ produced in the filter unit 212 in accordance with above formula (6). The voltage loss $L_{FEQ}$ corresponds to the power of the signal component removed by the filter unit 212.

Therefore, the power measurement unit 1 calculates a correction value G based on the voltage loss $L_{FEQ}$, for example, by above formula (7). Here, the function $f_{FEQ}(L_{FEQ})$ is designated from the relationship between the voltage loss $L_{FEQ}$ and the correction value G of the power $P_{GA}$ obtained from, for example actual measurement or simulation. Note that the setting control unit 218 may calculate the voltage loss $L_{FEQ}$ instead of the power measurement unit 1 and notify the power measurement unit 1 of the calculated voltage loss $L_{FEQ}$.

Figure 8:
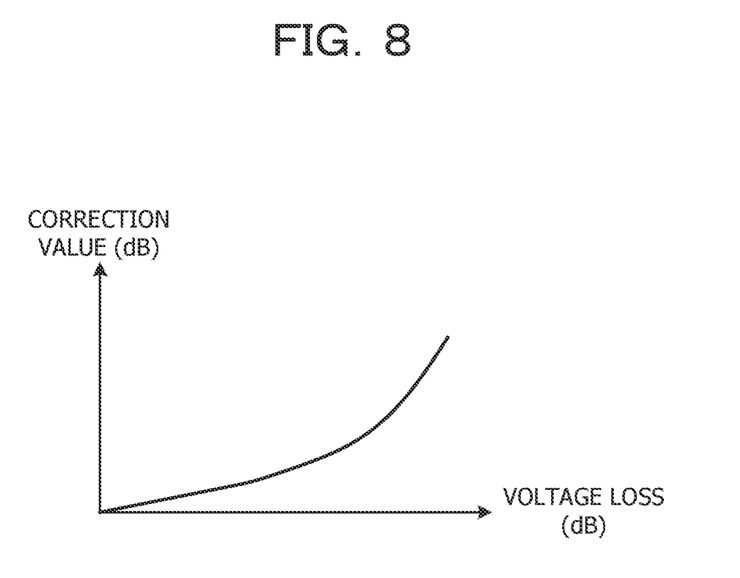
FIG. 8 is a diagram illustrating an example of the relationship between a voltage loss and a power correction value.

FIG. 8 is a diagram illustrating an example of the relationship between the voltage loss $L_{FEQ}$ (dB) and the correction value G (dB) of the power $P_{GA}$. The correction value G gradually increases as the voltage loss $L_{FEQ}$ increases. The function $f_{FEQ}(L_{FEQ})$ may be treated as, for example, a quadratic function of the voltage loss $L_{FEQ}$.

$$P=P_{GA}+G \quad (8)$$

$$P=P_{GA}+P_{Pf}+G \quad (9)$$

$$P=P_{GA}+L_{VOA}+G \quad (10)$$

$$P=P_{GA}+P_{Pf}+L_{VOA}+G \quad (11)$$

As indicated by above formulas (8) to (11), the power measurement unit 1 calculates the power P by adding the correction value G to the power $P_{GA}$ calculated from the gain monitor value $V_{GA}$.

In this manner, the setting control unit 218 notifies the power measurement unit 1 of the amplitudes Va and Vb. The power measurement unit 1 corrects the power measurement error of the optical signal of the predetermined channel CHi, based on the ratio of the amplitudes Va and Vb. Accordingly, the transponder 7 is allowed to reduce the power measurement error of the optical signal of the predetermined channel CHi.

(Configuration of Power Measurement Unit)

Figure 9:
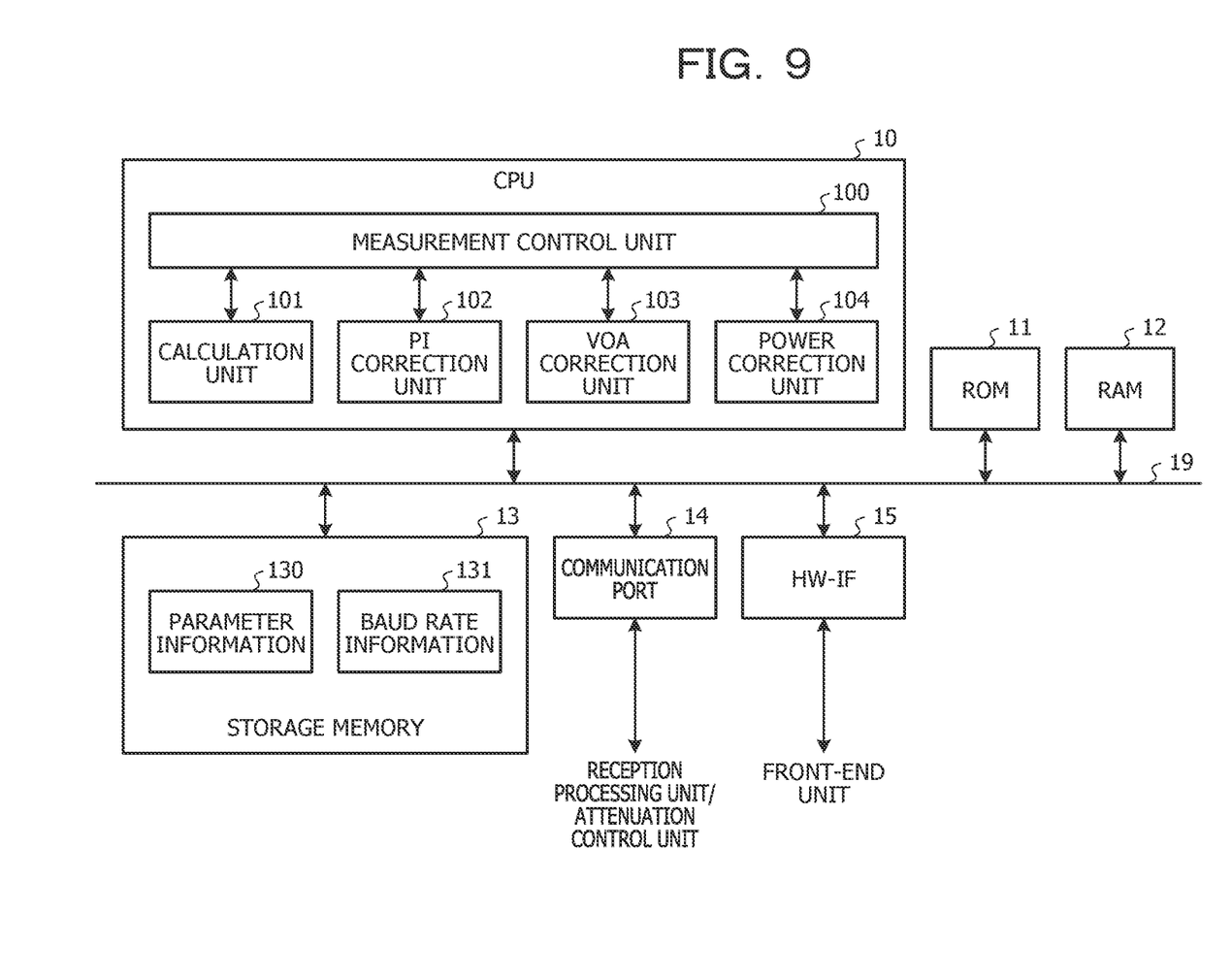
FIG. 9 is a configuration diagram illustrating an example of a power measurement unit.

FIG. 9 is a configuration diagram illustrating an example of the power measurement unit 1. The power measurement unit 1 includes a central processing unit (CPU) 10, a read only memory (ROM) 11, a random access memory (RAM) 12, a storage memory 13, a communication port 14, and a hardware interface unit (HW-IF) 15. The CPU 10 is connected, via a bus 19, to the ROM 11, the RAM 12, the storage memory 13, the communication port 14, and the HW-IF 15 such that signals can be input to and output from each other.

The ROM 11 stores a program for driving the CPU 10. The RAM 12 functions as a working memory of the CPU 10. The communication port 14 processes communication between, for example, the CPU 10 and the reception processing unit 21 and the attenuation control unit 42. The HW-IF 15 processes the communication between the CPU 10 and the front-end unit 3. Note that the communication port 14 and the HW-IF 15 are implemented by integrated circuits such as FPGAs or ASICs as an example.

When reading the program from the ROM 11, the CPU 10 forms, as functions, a measurement control unit 100, a calculation unit 101, a PI correction unit 102, a VOA correction unit 103, and a power correction unit 104. Note that the measurement control unit 100, the calculation unit 101, the PI correction unit 102, the VOA correction unit 103, and the power correction unit 104 may be implemented by an integrated circuit such as an FPGA or ASIC as an example, instead of the CPU 10.

Parameter information 130 and baud rate information 131 are stored in the storage memory 13. The parameter information 130 contains, for example, various parameters such as coefficients used in each function of above formulas (1), (2), (4), and (7), and threshold values. The baud rate information 131 contains a baud rate set by the setting control unit 218.

The measurement control unit 100 instructs the calculation unit 101, the PI correction unit 102, the VOA correction unit 103, and the power correction unit 104 to perform various operations in accordance with a sequence defined in the program. The measurement control unit 100 reads the gain monitor value $V_{GA}$ and the amplitude monitor value $V_{PI}$ from the front-end unit 3 and reads the VOA control voltage $V_{VOA}$ for the VOA 40 from the attenuation control unit 42. In addition, the measurement control unit 100 reads the baud rate being selected, from the setting control unit 218 and stores the read baud rate in the storage memory 13 as the baud rate information 131. The measurement control unit 100 instructs the calculation unit 101 to calculate the power $P_{GA}$ based on the gain monitor value $V_{GA}$.

The calculation unit 101 calculates the power $P_{GA}$ in accordance with above formula (1), in accordance with the instruction of the measurement control unit 100. At this time, the calculation unit 101 acquires the gain monitor value $V_{GA}$ from the measurement control unit 100 and acquires the coefficient of the function $f_{GA}(V_{GA})$ from the parameter information 130. The calculation unit 101 outputs the power $P_{GA}$ to the measurement control unit 100.

The measurement control unit 100 compares the gain monitor value $V_{GA}$ with the threshold value Vth, determines that the actual power of the optical signal falls within the gain saturation range when $V_{GA}$>Vth holds, and instructs the PI correction unit 102 to calculate the correction value $P_{PI}$ based on the amplitude monitor value $V_{PI}$.

The PI correction unit 102 calculates the correction value $P_{PI}$ in accordance with above formula (2), in accordance with the instruction of the measurement control unit 100. At this time, the PI correction unit 102 acquires the amplitude monitor value $V_{PI}$ from the measurement control unit 100 and acquires the coefficient of the function $f_{PI}(V_{PI})$ from the parameter information 130. The PI correction unit 102 outputs the correction value $P_{PI}$ to the measurement control unit 100.

The measurement control unit 100 compares the VOA control voltage $V_{VOA}$ with a threshold value Ath, determines that the power of the optical signal falls within the AGC/VOA operating range when $V_{VOA}$>Ath holds, and instructs the VOA correction unit 103 to calculate the correction value $L_{VOA}$ based on the VOA control voltage $V_{VOA}$.

The VOA correction unit 103 calculates the correction value $L_{VOA}$ in accordance with above formula (4), in accordance with the instruction of the measurement control unit 100. At this time, the VOA correction unit 103 acquires the VOA control voltage $V_{VOA}$ from the measurement control unit 100 and acquires the coefficient of the function $f_{VOA}(V_{VOA})$ from the parameter information 130. The VOA correction unit 103 outputs the correction value $L_{VOA}$ to the measurement control unit 100.

The measurement control unit 100 compares the baud rate with a threshold value THr, determines that the power of the signal components of the adjacent channels CH(i−1) and CH(i+1) is included in the power $P_{GA}$ calculated by the calculation unit 101 when the baud rate<THr holds, and instructs the power correction unit 104 to calculate the correction value G based on the voltage loss $L_{FEQ}$.

The power correction unit 104 calculates the voltage loss $L_{FEQ}$ and the correction value G in accordance with above formulas (6) and (7), respectively, in accordance with the instruction of the measurement control unit 100. At this time, the power correction unit 104 acquires the amplitudes Va and Vb from the measurement control unit 100 and acquires the coefficient of the function $f_{FEQ}(L_{FEQ})$ from the parameter information 130. The power correction unit 104 outputs the correction value G to the measurement control unit 100.

The measurement control unit 100 calculates the power P of the measurement result in accordance with any one of above formulas (8) to (11). The measurement control unit 100 uses formula (8) when having caused only the correction value G to be calculated, uses formula (9) when having caused only the correction values $P_{PI}$ and G to be calculated, and uses formula (10) when having caused only the correction values $L_{VOA}$, and G to be calculated. In addition, the measurement control unit 100 uses formula (11) when having caused all the correction values $P_{PI}$, $L_{VOA}$, and G to be calculated.

(Operation of Power Measurement Unit)

Figure 10:
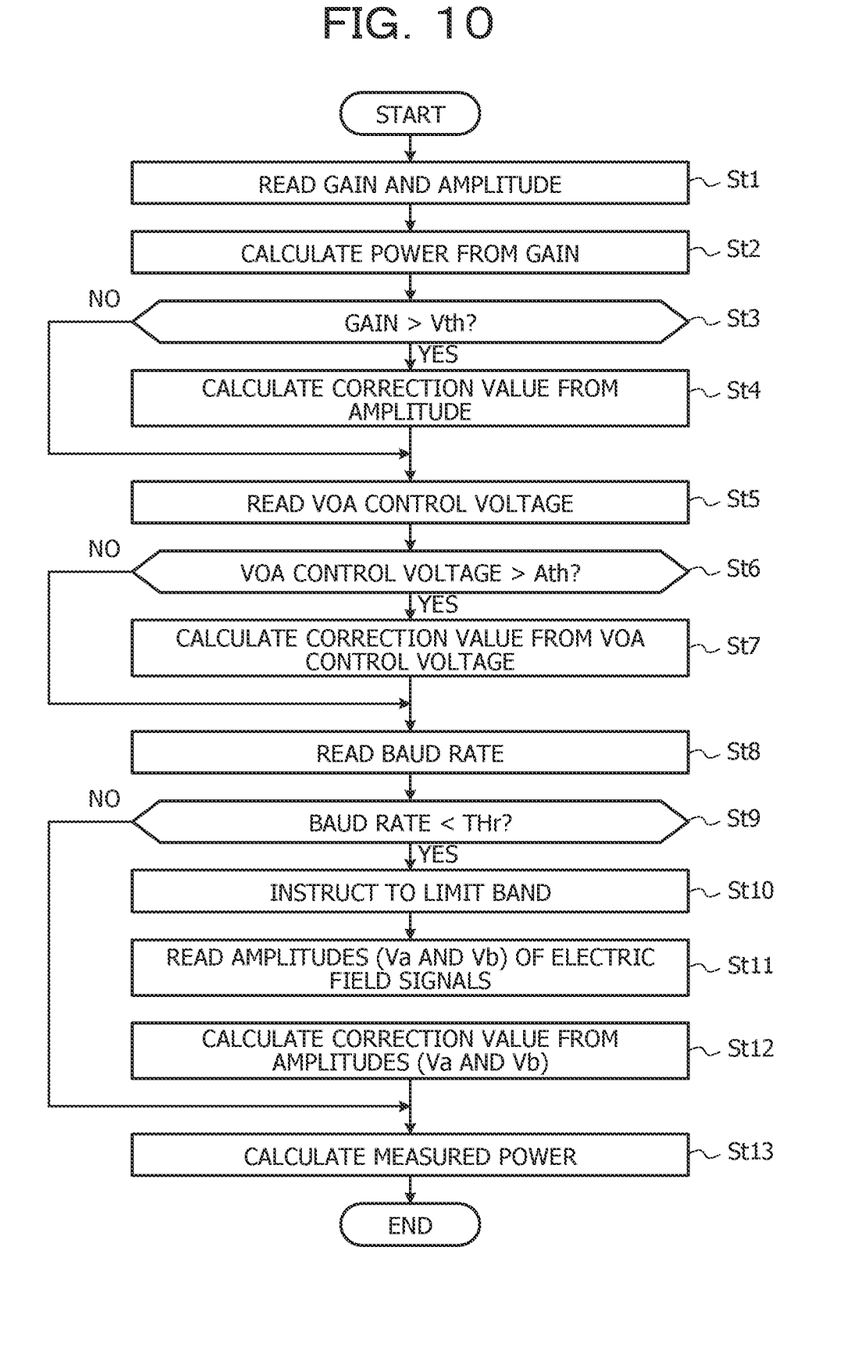
FIG. 10 is a flowchart illustrating an example of the operation of the power measurement unit.

FIG. 10 is a flowchart illustrating an example of the operation of the power measurement unit 1. This operation is executed, for example, when the power measurement unit 1 is instructed by the monitoring control device (not illustrated) to measure the power.

First, the measurement control unit 100 reads the gain monitor value $V_{GA}$ and the amplitude monitor value $V_{PI}$ from the front-end unit 3 (step St1). Next, the calculation unit 101 calculates the power $P_{GA}$ of the optical signal of the predetermined channel CHi, based on the gain monitor value $V_{GA}$ in accordance with above formula (1) (step St2). This allows the calculation unit 101 to take the measurements from the electric field signals XI, XQ, YI, and YQ after the detection of the optical signal, without using an external photodiode or the like.

Next, the measurement control unit 100 compares the gain monitor value $V_{GA}$ with the threshold value Vth (step St3). When $V_{GA}$>Vth holds (Yes in step St3), the PI correction unit 102 calculates the correction value $P_{PI}$ of the power $P_{GA}$, based on the amplitude monitor value $V_{PI}$ in accordance with above formula (2) (step St4). The power measurement unit 1 corrects the power measurement error of the optical signal of the predetermined channel, based on the amplitude monitor values $V_{PI}$ of the electric field signals XI, XQ, YI, and YQ. Therefore, as described above, the power measurement unit 1 may measure the power with high accuracy even if the power of the optical signal falls within the gain saturation range.

Meanwhile, when $V_{GA} \leq$Vth holds (No in step St3), the operation in step St4 is not executed because the power of the optical signal falls within the AGC operating range or the AGC/VOA operating range, and the correction of the measurement error based on the amplitude monitor value $V_{PI}$ is not to be involved. Note that the threshold value Vth is designated from the characteristics in FIG. 3, for example, obtained by an experiment, a simulation, or the like.

Next, the measurement control unit 100 reads the VOA control voltage $V_{VOA}$ for the VOA 40 from the attenuation control unit 42 (step St5). Next, the measurement control unit 100 compares the VOA control voltage $V_{VOA}$ with the threshold value Ath (step St6).

When $V_{VOA}$>Ath holds (Yes in step St6), the VOA correction unit 103 calculates the correction value $L_{VOA}$ for the power loss, based on the VOA control voltage $V_{VOA}$ for the VOA 40 by above formula (4) (step St7). The power measurement unit 1 corrects the power measurement error of the optical signal of the predetermined channel CHi, based on the VOA control voltage $V_{VOA}$ for the VOA 40. Therefore, as described above, the power measurement unit 1 may measure the power with high accuracy even if the power of the optical signal falls within the AGC/VOA operating range.

Meanwhile, when $V_{VOA} \leq Ath$ holds (No in step St6), the operation in step St7 is not executed because the power of the optical signal falls outside the AGC/VOA operating range, and the correction of the measurement error based on the VOA control voltage $V_{VOA}$ is not to be involved. Note that the threshold value Ath is designated from the characteristics in FIG. 4, for example, obtained by an experiment, a simulation, or the like.

Next, the measurement control unit 100 reads the baud rate of the transponder 7 from the setting control unit 218 (step St8). Next, the measurement control unit 100 compares the baud rate with the threshold value THr (step St9). When the baud rate<THr holds (Yes in step St9), the measurement control unit 100 instructs the setting control unit 218 to limit the bandwidth of the filter unit 212 (step St10). Consequently, the passband of the filter unit 212 becomes narrower than the receiving bandwidth, and thus the signal components of the adjacent channels CH(i−1) and CH(i+1) included in the electric field signals XI, XQ, YI, and YQ are reduced.

Next, the measurement control unit 100 reads the amplitudes Va and Vb of the electric field signals XI, XQ, YI, and YQ in the preceding stage and the subsequent stage of the filter unit 212, from the setting control unit 218 (step St11).

Next, the power correction unit calculates the correction value G from the amplitudes Va and Vb in accordance with above formulas (6) and (7) (step St12). As described above, the power measurement unit 1 corrects the power measurement error of the optical signal of the predetermined channel CHi, based on the ratio of the amplitudes Va and Vb. This reduces the power measurement error of the optical signal of the predetermined channel CHi.

Meanwhile, when the baud rate≥THr holds (No in step St9), the measurement control unit 100 concludes that the bandwidth of the optical signal is substantially the same as the receiving bandwidth and does not involve the correction by the amplitudes Va and Vb, and does not execute steps St10 to St12.

Next, the measurement control unit 100 calculates the power (measured power) P of the measurement result in accordance with any one of above formulas (8) to (11) (step St13). For example, the monitoring control device (not illustrated) is notified of the power P. The power measurement unit 1 operates in this manner.

The embodiments described above are examples of preferred embodiments. However, the embodiments are not limited thereto, and a variety of modifications may be made without departing from the gist of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A signal processing device comprising:
   a first conversion circuit that, among optical signals of a plurality of channels included in wavelength division multiplexed optical signal, converts electric field signals that indicate electric field components of the optical signal of a predetermined channel received in a receiving bandwidth wider than a frequency interval of optical signals of the plurality of channels, from time domain signals into frequency domain signals;
   a filter circuit that passes the electric field signals converted into the frequency domain signals with a passband narrower than the receiving bandwidth;
   a second conversion circuit that converts the electric field signals passed by the filter circuit, from the frequency domain signals into the time domain signals;
   an amplitude measurement circuit that measures first amplitudes of the electric field signals input to the filter circuit from the first conversion circuit and second amplitudes of the electric field signals input to the second conversion circuit from the filter circuit, individually; and
   a notification circuit that notifies a power measurement device that measures power of the optical signal of the predetermined channel, of the first amplitudes and the second amplitudes used in correction of a measurement error of the power of the optical signal of the predetermined channel.

2. The signal processing device according to claim 1, wherein the filter circuit passes the electric field signals with the passband according to the frequency interval.

3. The signal processing device according to claim 1, wherein the amplitude measurement circuit calculates root mean squares for each of the first amplitudes and the second amplitudes, and
   the notification circuit notifies the power measurement device of the root mean squares for each of the first amplitudes and the second amplitudes.

4. A transmission device comprising:
   a light receiving circuit that, among optical signals of a plurality of channels included in wavelength division multiplexed optical signal, receives the optical signal of a predetermined channel in a receiving bandwidth wider than a frequency interval of optical signals of the plurality of channels, and outputs electric field signals that indicate electric field components of the optical signal of the predetermined channel;
   a power measurement circuit that measures power of the optical signal of the predetermined channel;
   a first conversion circuit that converts the electric field signals from time domain signals into frequency domain signals;
   a filter circuit that passes the electric field signals converted into the frequency domain signals with a passband narrower than the receiving bandwidth;
   a second conversion circuit that converts the electric field signals passed by the filter circuit, from the frequency domain signals into the time domain signals;
   an amplitude measurement circuit that measures first amplitudes of the electric field signals input to the filter circuit from the first conversion circuit and second amplitudes of the electric field signals input to the second conversion circuit from the filter circuit, individually; and a notification circuit that notifies the power measurement circuit of the first amplitudes and the second amplitudes, wherein the power measurement circuit corrects a measurement error of the power of the optical signal of the predetermined channel, based on a ratio of the first amplitudes and the second amplitudes.

5. The transmission device according to claim 4, wherein the filter circuit passes the electric field signals with the passband according to the frequency interval.

6. The transmission device according to claim 4, wherein the amplitude measurement circuit calculates root mean squares for each of the first amplitudes and the second amplitudes, and the notification circuit notifies the power measurement device of the root mean squares for each of the first amplitudes and the second amplitudes.

7. The transmission device according to claim 4, wherein the light receiving circuit includes an amplifier that amplifies the electric field signals such that amplitudes of the electric field signals coincide with a predetermined value, and the power measurement circuit calculates the power of the optical signal of the predetermined channel, based on a gain of the amplifier.

8. The transmission device according to claim 7, wherein the power measurement circuit acquires the amplitudes of the electric field signals after amplification from the light receiving circuit, and corrects the measurement error of the power of the optical signal of the predetermined channel, based on the amplitudes of the electric field signals.

9. The transmission device according to claim 4, further comprising a variable optical attenuator that attenuates the power of the optical signal of the predetermined channel input to the light receiving circuit, by an attenuation amount in accordance with a control voltage, wherein the power measurement circuit corrects the measurement error of the power of the optical signal of the predetermined channel, based on the control voltage.

\* \* \* \* \*